UNITED STATES PATENT OFFICE.

ALBERT KISSEL, OF FRANKFORT-ON-THE-MAIN, GERMANY, ASSIGNOR TO C. ZIMMER, OF SAME PLACE.

HARDENING RESINS.

SPECIFICATION forming part of Reissued Letters Patent No. 10,714, dated April 20, 1886.

Original No. 303,436, dated August 12, 1884. Application for reissue filed September 8, 1885. Serial No. 176,458. Patented in Germany March 5, 1884, No. 30,000; in France May 13, 1884, No. 162,098; in Belgium May 13, 1884, No. 65,143, and in England May 21, 1884, No. 8,036.

*To all whom it may concern:*

Be it known that I, ALBERT KISSEL, a citizen of Germany, and residing at Frankfort-on-the-Main, Germany, have invented new and useful Improvements in the Method of Hardening or Improving Resins, of which the following is a specification.

The inventor has discovered that natural resins and balsams of the *Coniferæ* and the products obtained from the same, as also fresh resins and recent fossil resins found in commerce of the *Dipterocarpeæ* and *Cæsalpineæ* attain a higher softening point when the acids contained in these resins are made to combine either wholly or partially with caustic lime or other caustic alkaline earths to form salts of the respective alkaline earths. This greater degree of hardness stands in direct proportion to the amount of alkaline earthy salts so introduced into or formed in the resins, &c.; but the quantity of caustic alkaline earth employed should not be in excess of what is required to neutralize all the acid contained in the resin, balsam, or resinous product to be treated.

The conversion of the acids of the resins into salts is carried out as follows: The resin, in a melted or dissolved state, is mixed with caustic lime, or with some other caustic alkaline earth. The acid aforesaid may be either wholly or partially converted into a salt by the addition of more or less caustic lime, according to the purpose for which the resin is to be used, or a mixture may be made of converted resins and untreated resins, balsams, or products manufactured from resins. By these means one is able to obtain resins or mixtures of resins of various degrees of hardness. Fats, oils, different kinds of tar, pitch, natural or artificial bituminous products can also be brought to a higher softening-point if mixed or melted with resins or products from the manufacture of resins which have been hardened by means of the bases and in the manner above described.

Although, as already mentioned, other caustic alkaline earths besides caustic lime can be used for the purposes above described—such, for instance, as baryta, strontia, magnesia—yet caustic lime would have the preference on economical grounds.

Alkalies must not be applied in this process, as they make the mass greasy, and form with the resin a soap soluble in water—in fact, do more harm than good in the process of hardening the resin.

I claim—

1. The conversion of the acids contained in the balsams or resins hereinbefore referred to, or in their products or compounds, or by-products, or in mixtures of such resins with other substances, as mentioned, by means of caustic lime or other caustic alkaline earths into the salts of those earths respectively, in order to harden such resins, resinous by-products, or resin preparations.

2. The act of combining caustic lime or other caustic alkaline earth with the acid or acids contained in either or any of the resins or resinous products hereinbefore referred to, in order to harden such resin or resinous product, or to raise the same to a higher softening-point, substantially as described.

3. The method of hardening of either or any of the resins or resinous products hereinbefore referred to, by partially or wholly neutralizing the acid or acids contained therein, by the combination of such acid or acids with caustic lime or other caustic alkaline earth, substantially as described.

4. The herein-described resin or resinous product brought to a higher softening-point by the partial or entire neutralization of the acid or acids contained therein, by combination of such acid or acids with caustic lime or other caustic alkaline earth, to form a salt or salts of such alkaline earths, respectively.

ALBERT KISSEL.

Witnesses:
JOSEPH PATRICK,
JEAN GRUND.